US009406004B2

(12) United States Patent
Yamagata

(10) Patent No.: US 9,406,004 B2
(45) Date of Patent: Aug. 2, 2016

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Tatsuhiro Yamagata, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/925,918

(22) Filed: Oct. 28, 2015

(65) Prior Publication Data

US 2016/0132757 A1 May 12, 2016

(30) Foreign Application Priority Data

Nov. 6, 2014 (JP) ................................ 2014-226402

(51) Int. Cl.

*H04N 1/40* (2006.01)
*H04N 1/60* (2006.01)
*G06K 15/02* (2006.01)

(52) U.S. Cl.

CPC .......... *G06K 15/1878* (2013.01); *G06K 15/021* (2013.01); *G06K 15/1868* (2013.01); *H04N 1/6019* (2013.01)

(58) Field of Classification Search

CPC ............ G06K 15/1878; G06K 15/021; G06K 15/1868; H04N 1/6019

See application file for complete search history.

(56) References Cited

U.S. PATENT DOCUMENTS 7,746,526 B2 * 6/2010 Fan ..................... H04N 1/6097 347/6
2014/0098387 A1 * 4/2014 Chang .................. H04N 1/6058 358/1.9

FOREIGN PATENT DOCUMENTS

JP 2007-088636 A 4/2007
JP 2010-232975 A 10/2010

* cited by examiner

*Primary Examiner* — Quang N Vo

(74) *Attorney, Agent, or Firm* — Fitzpatrick, Cella, Harper & Scinto

(57) ABSTRACT

If an ink color decomposition table with a maximum ink amount, which is different from a created color decomposition table, is automatically generated using the created color decomposition table, and used for, for example, inkjet printing, the ink use amount may be excessive, leading to unevenness in glossiness. According to an embodiment of this invention, for example, in a case where an ink limit amount at each grid point of a color decomposition lookup table to be used for image processing is held, and the color decomposition lookup table is automatically generated, the ink amount of each grid point is controlled to be equal to or smaller than the limit amount.

20 Claims, 12 Drawing Sheets

| INK SIGNAL VALUE | INK AMOUNT |
|---|---|
| 0 | 0% |
| ... | ... |
| 100 | 39% |
| ... | ... |
| 128 | 50% |
| ... | ... |
| 255 | 100% |

F I G. 5
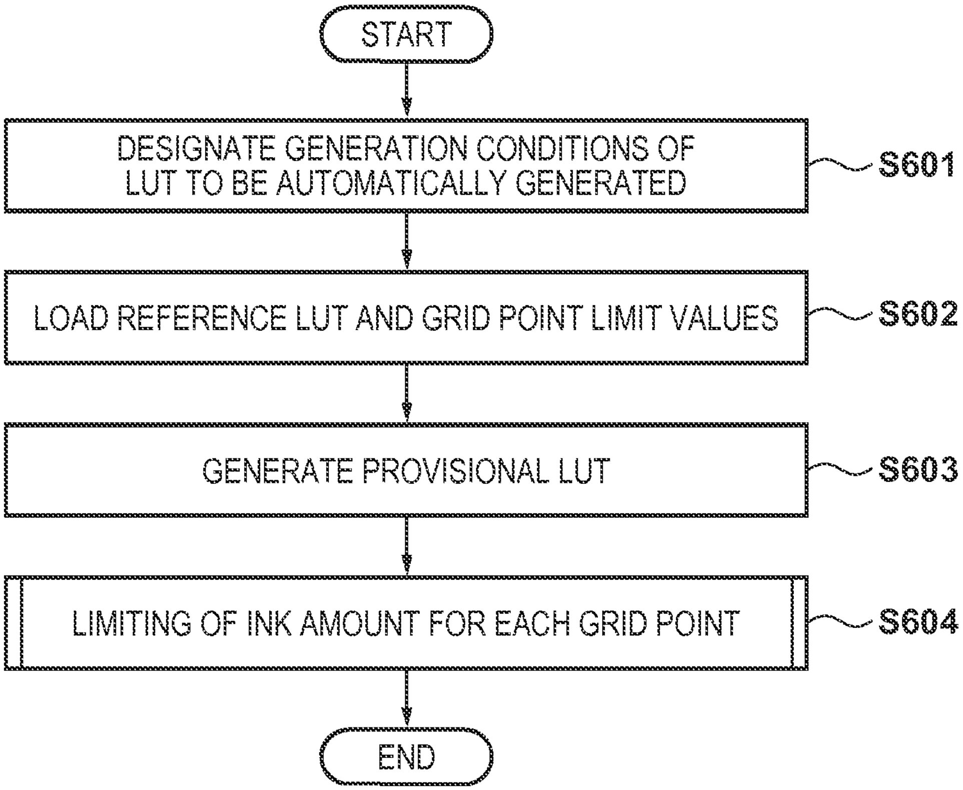
F I G. 6
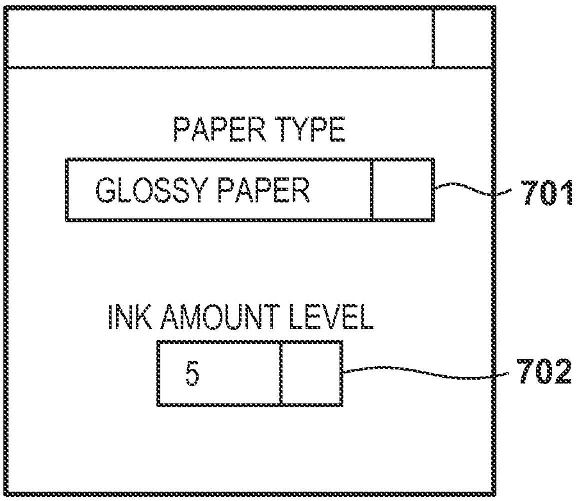

FIG. 7A

| ID | PLAIN PAPER | ART PAPER | GLOSSY PAPER |
|---|---|---|---|
| 1 | 100% | 100% | 100% |
| ... | ... | ... | ... |
| 8 | 180% | 180% | 170% |
| 9 | 200% | 190% | 160% |
| ... | ... | ... | ... |
| 181 | 150% | 160% | 140% |
| ... | ... | ... | ... |
| 729 | 0% | 0% | 0% |

FIG. 7B

| ID | PLAIN PAPER | ART PAPER | GLOSSY PAPER |
|---|---|---|---|
| 1 | 255 | 255 | 255 |
| ... | ... | ... | ... |
| 8 | 459 | 459 | 434 |
| 9 | 510 | 485 | 408 |
| ... | ... | ... | ... |
| 181 | 383 | 408 | 357 |
| ... | ... | ... | ... |
| 729 | 0 | 0 | 0 |

FIG. 8A

REFERENCE LUT

| ID | C | M | Y | K | SUM |
|---|---|---|---|---|---|
| 0 | 0 | 0 | 0 | 159 | 159 |
| ... | ... | ... | ... | ... | ... |
| 8 | 120 | 120 | 0 | 15 | 255 |
| 9 | 127 | 128 | 0 | 0 | 255 |
| ... | ... | ... | ... | ... | ... |
| 181 | 10 | 10 | 159 | 76 | 255 |
| ... | ... | ... | ... | ... | ... |
| 729 | 0 | 0 | 0 | 0 | 0 |

→

PROVISIONAL LUT

| ID | C | M | Y | K | SUM |
|---|---|---|---|---|---|
| 0 | 0 | 0 | 0 | 254 | 254 |
| ... | ... | ... | ... | ... | ... |
| 8 | 192 | 192 | 0 | 24 | 408 |
| 9 | 203 | 205 | 0 | 0 | 408 |
| ... | ... | ... | ... | ... | ... |
| 181 | 16 | 16 | 254 | 122 | 408 |
| ... | ... | ... | ... | ... | ... |
| 729 | 0 | 0 | 0 | 0 | 0 |

FIG. 8B

REFERENCE LUT

| ID | C | M | Y | K | SUM |
|---|---|---|---|---|---|
| 0 | 0 | 0 | 0 | 255 | 255 |
| ... | ... | ... | ... | ... | ... |
| 8 | 240 | 240 | 0 | 30 | 510 |
| 9 | 255 | 255 | 0 | 0 | 510 |
| ... | ... | ... | ... | ... | ... |
| 181 | 20 | 20 | 255 | 120 | 415 |
| ... | ... | ... | ... | ... | ... |
| 729 | 0 | 0 | 0 | 0 | 0 |

→

PROVISIONAL LUT

| ID | C | M | Y | K | SUM |
|---|---|---|---|---|---|
| 0 | 0 | 0 | 0 | 255 | 255 |
| ... | ... | ... | ... | ... | ... |
| 8 | 192 | 192 | 0 | 24 | 408 |
| 9 | 204 | 204 | 0 | 0 | 408 |
| ... | ... | ... | ... | ... | ... |
| 181 | 16 | 16 | 204 | 96 | 332 |
| ... | ... | ... | ... | ... | ... |
| 729 | 0 | 0 | 0 | 0 | 0 |

FIG. 8C

PROVISIONAL LUT

| ID | C | M | Y | K | SUM |
|---|---|---|---|---|---|
| 0 | 0 | 0 | 0 | 255 | 255 |
| ... | ... | ... | ... | ... | ... |
| 8 | 192 | 192 | 0 | 24 | 408 |
| 9 | 203 | 205 | 0 | 0 | 408 |
| ... | ... | ... | ... | ... | ... |
| 181 | 16 | 16 | 254 | 122 | 408 |
| ... | ... | ... | ... | ... | ... |
| 729 | 0 | 0 | 0 | 0 | 0 |

→

LIMITED LUT

| ID | C | M | Y | K | SUM |
|---|---|---|---|---|---|
| 0 | 0 | 0 | 0 | 255 | 255 |
| ... | ... | ... | ... | ... | ... |
| 8 | 204 | 204 | 0 | 26 | 434 |
| 9 | 203 | 205 | 0 | 0 | 408 |
| ... | ... | ... | ... | ... | ... |
| 181 | 14 | 14 | 223 | 106 | 357 |
| ... | ... | ... | ... | ... | ... |
| 729 | 0 | 0 | 0 | 0 | 0 |

FIG. 8D

PROVISIONAL LUT

| ID | C | M | Y | K | SUM |
|---|---|---|---|---|---|
| 0 | 0 | 0 | 0 | 255 | 255 |
| ... | ... | ... | ... | ... | ... |
| 8 | 192 | 192 | 0 | 24 | 408 |
| 9 | 204 | 204 | 0 | 0 | 408 |
| ... | ... | ... | ... | ... | ... |
| 181 | 16 | 16 | 204 | 96 | 332 |
| ... | ... | ... | ... | ... | ... |
| 729 | 0 | 0 | 0 | 0 | 0 |

→

LIMITED LUT

| ID | C | M | Y | K | SUM |
|---|---|---|---|---|---|
| 0 | 0 | 0 | 0 | 255 | 255 |
| ... | ... | ... | ... | ... | ... |
| 8 | 204 | 204 | 0 | 26 | 434 |
| 9 | 204 | 204 | 0 | 0 | 408 |
| ... | ... | ... | ... | ... | ... |
| 181 | 17 | 17 | 219 | 103 | 357 |
| ... | ... | ... | ... | ... | ... |
| 729 | 0 | 0 | 0 | 0 | 0 |

IMAGE PROCESSING APPARATUS, IMAGE PROCESSING METHOD, AND STORAGE MEDIUM

BACKGROUND OF THE INVENTION

1. Field of the Invention

The present invention relates to an image processing apparatus, an image processing method, and a storage medium, and particularly to a method of creating a color decomposition table (to be referred to as an LUT hereinafter) to be used to convert an image signal into an ink signal for ink, toner, or the like.

2. Description of the Related Art

A conventional inkjet printing apparatus executes printing by inputting an image signal expressed by a given color space, converting the image signal into an image signal expressed by ink colors, and discharging inks based on the image signal from a printhead to a print medium. A desired color is expressed by a combination of a plurality of inks and its ink amount on the print medium, thereby forming an image. In the image signal conversion processing, a lookup table (LUT) for conversion is held in advance in accordance with a printing method and print medium, and interpolation processing is performed with reference to the grid points of the LUT.

FIG. 13 is a view showing an example of an LUT. An LUT 101 generally has a structure of a three-dimensional lookup table (3D LUT), and stores a combination of ink types and their ink signal values in each grid point 102 of the LUT 101. The grid points 102 indicate all points at which meshes intersect each other in FIG. 13, and are representative points of the LUT 101.

In general, it is possible to improve the color development by increasing the amount of information indicating the ink amount set in the LUT. However, if the ink amount is excessively increased, bleeding or overflow of inks may occur in actual printing. To avoid the occurrence of such bleeding or overflow, the limit value (maximum ink value) of the ink amount is determined in accordance with the characteristic of a print medium, an ink characteristic, a printing quality, and the like. Therefore, upon creating an LUT, it is necessary to determine an information amount indicating a combination pattern of ink types and an ink amount so as to be equal to or smaller than the set maximum ink amount limit value.

A recent user may print an image using print paper (user paper) of user's taste other than authorized paper provided by a printer maker. To meet such needs, the printer maker prepares a plurality of LUTs with different maximum ink amounts. The user can select an LUT optimum for the user paper by printing a designated chart using these LUTs, and checking bleeding/overflow of ink. Thus, as the number of LUTs provided by the printer maker is larger, a choice of LUTs is larger, thereby allowing an LUT more optimum for the user paper to be applied. However, in order for the printer maker to prepare a larger number of LUTs, an enormous time and a mass memory for storing the LUTs are required. To solve this problem, if it is possible to automatically create LUTs with different maximum ink amounts based on an LUT created in advance in which any desired maximum ink amount is set, it is possible to provide an LUT more optimum for the user paper.

There has been conventionally proposed a method of automatically generating an LUT. For example, according to Japanese Patent Laid-Open No. 2007-088636, the ink amount saturation degrees of the primary, secondary, third, and higher-order colors are calculated based on an LUT created in advance (to be referred to as a reference LUT hereinafter), its maximum ink value (to be referred to as a reference maximum value hereinafter), and the maximum value (to be referred to as the generation maximum value hereinafter) of an LUT to be automatically generated. Then, the ink amount of each grid point of the LUT is automatically generated using the saturation degrees. In addition, Japanese Patent Laid-Open No. 2010-232975 proposes a technique of automatically generating an LUT by calculating an adjustment amount based on a reference maximum value and a generation maximum value, and adjusting a reference table based on the adjustment amount.

In any of the above-described patent publications, however, the total ink amount is limited by only the maximum ink amount, and if the LUT is used to execute printing, unevenness in glossiness may occur in a printed image depending on a grid point. The cause of unevenness in glossiness will be described in detail later.

SUMMARY OF THE INVENTION

Accordingly, the present invention is conceived as a response to the above-described disadvantages of the conventional art.

For example, an image processing apparatus, image processing method, and storage medium according to this invention are capable of automatically generating a lookup table that can print a high-resolution image without causing unevenness in glossiness in the image in a case where the image processing apparatus, image processing method, and storage medium are used to print the image.

According to one aspect of the present invention, there is provided an image processing apparatus for creating a lookup table in correspondence with a print medium to be used and a print agent amount to be used for printing on the print medium, and performing image processing for input image data using the created lookup table, comprising: a holding unit configured to hold a reference lookup table corresponding to a type of the print medium, and a limit value configurable at each grid point of the created lookup table; a setting unit configured to set the type of the print medium to be used and a maximum print agent amount; a creating unit configured to create a provisional lookup table based on the reference lookup table held in the holding unit, and the print medium and the maximum print agent amount which have been set by the setting unit; a comparison unit configured to compare a value of each grid point of the provisional lookup table created by the creating unit with the limit value configurable at each grid point; a generation unit configured to generate, based on a result of comparison by the comparison unit, a lookup table such that a value of each grid point is not larger than the limit value configurable at each grid point; and an image processing unit configured to perform image processing for the input image data using the lookup table generated by the generation unit.

According to another aspect of the present invention, there is provided a non-transitory computer readable storage medium which stores a computer program to be executed in a processor of an image processing apparatus for creating a lookup table in correspondence with a print medium to be used and a print agent amount to be used for printing on the print medium, and performing image processing for input image data using the created lookup table, the program comprising: holding a reference lookup table corresponding to a type of the print medium, and a limit value configurable at each grid point of the created lookup table; setting the type of the print medium to be used and a maximum print agent amount; creating a provisional lookup table based on the held reference lookup table, and the print medium and the maximum print agent amount which have been set; comparing a value of each grid point of the created provisional lookup table with the limit value configurable at each grid point; generating, based on a result of the comparing, a lookup table such that a value of each grid point is not larger than the limit value configurable at each grid point; and performing image processing for input image data using the generated lookup table.

According to still another aspect of the present invention, there is provided an image processing method for an image processing apparatus for creating a lookup table in correspondence with a print medium to be used and a print agent amount to be used for printing on the print medium, and performing image processing for input image data using the created lookup table, the method comprising: holding a reference lookup table corresponding to a type of the print medium, and a limit value configurable at each grid point of the created lookup table; setting the type of the print medium to be used and a maximum print agent amount; creating a provisional lookup table based on the held reference lookup table, and the print medium and the maximum print agent amount which have been set; comparing a value of each grid point of the created provisional lookup table with the limit value configurable at each grid point; generating, based on a result of the comparing, a lookup table such that a value of each grid point is not larger than the limit value configurable at each grid point; and performing image processing for the input image data using the generated lookup table.

The invention is particularly advantageous since each grid point value of a lookup table is automatically generated to be equal to or smaller than a limit value configurable at each grid point, and thus the use of a print agent amount is limited even if printing is executed by performing image processing using the lookup table. This prevents unevenness in glossiness from occurring in a printed image, thereby achieving satisfactory image printing. It is also possible to suppress the consumption of a print agent used for printing.

Further features of the present invention will become apparent from the following description of exemplary embodiments (with reference to the attached drawings).

BRIEF DESCRIPTION OF THE DRAWINGS

FIG. 5 is a flowchart illustrating processing of automatically generating a color decomposition table (LUT) according to the first embodiment.

FIG. 6 is a view showing the GUI of an application of automatically generating a color decomposition table (LUT).

FIGS. 7A and 7B are tables showing the values of the respective grid points of LUTs respectively corresponding to paper types;

FIGS. 8A, 8B, 8C and 8D are views showing an example of a process of generating an LUT, in which values are limited, from a reference LUT via a provisional LUT.

DESCRIPTION OF THE EMBODIMENTS

Exemplary embodiments of the present invention will now be described in detail in accordance with the accompanying drawings.

In this specification, the terms "print" and "printing" not only include the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

Also, the term "print medium" not only includes a paper sheet used in common printing apparatuses, but also broadly includes materials, such as cloth, a plastic film, a metal plate, glass, ceramics, wood, and leather, capable of accepting ink.

Furthermore, the term "ink" (to be also referred to as a "liquid" hereinafter) should be extensively interpreted similar to the definition of "print" described above. That is, "ink" includes a liquid which, when applied onto a print medium, can form images, figures, patterns, and the like, can process the print medium, and can process ink. The process of ink includes, for example, solidifying or insolubilizing a coloring agent contained in ink applied to the print medium.

Figure 1A:
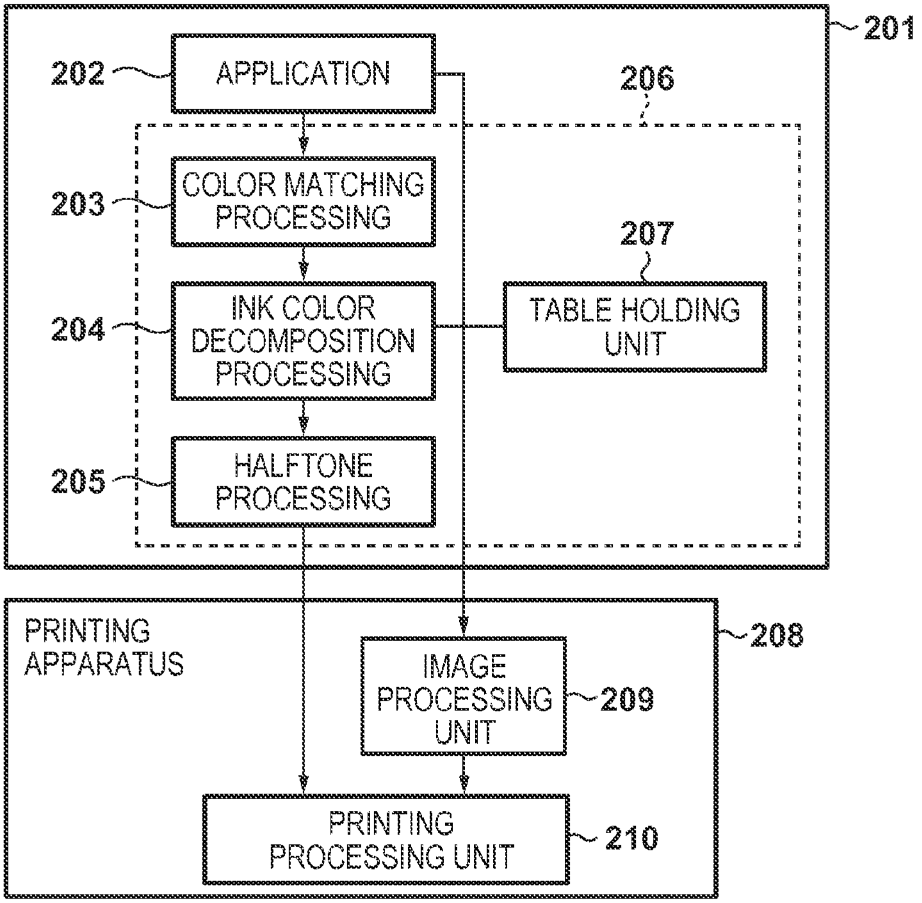
FIGS. 1A and 1B are block diagrams showing the configuration of a printing system according to an exemplary embodiment of the present invention.
Figure 1B:
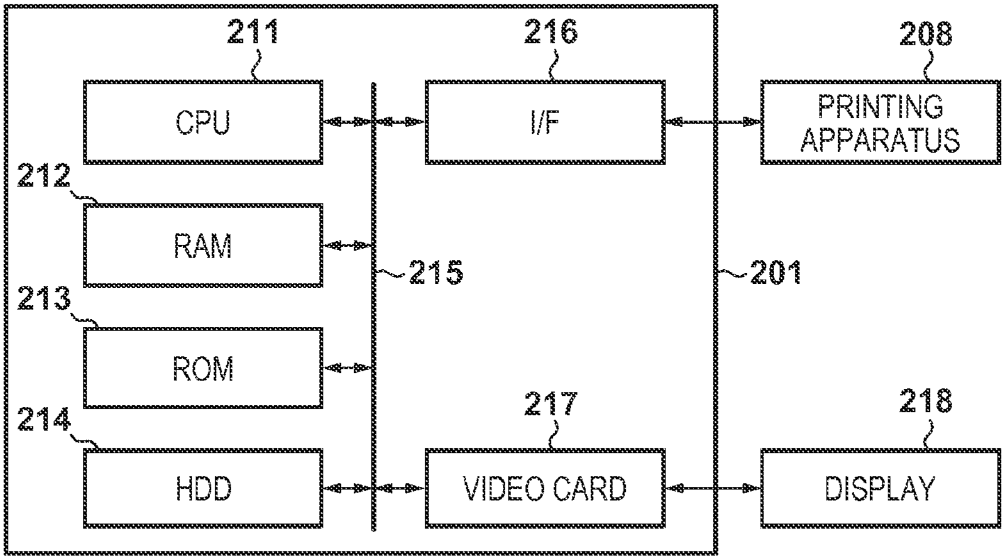

FIGS. 1A and 1B are block diagrams showing the configuration of a printing system according to an exemplary embodiment of the present invention.

As shown in FIG. 1A, the printing system includes a computer (to be referred to as a host apparatus hereinafter) 201 functioning as an image processing apparatus, and an inkjet printing apparatus (to be referred to as a printing apparatus hereinafter) 208. The printing apparatus 208 includes a printhead (not shown) for discharging four ink colors of cyan (C), magenta (M), yellow (Y), and black (K). Note that a type of printhead for discharging seven ink colors obtained by adding light cyan, light magenta, and gray to the four colors of cyan, magenta, yellow, and black, or a type of printhead for discharging 10 ink colors obtained by adding three colors of red, green, and blue to the above colors may be mounted.

The host apparatus 201 executes an application program (to be referred to as an application hereinafter) 202 under the control of an operating system (OS). The application 202 displays a user interface (UI) on a display (to be described later). The user operates the UI to cause the host apparatus 201 to obtain image data. Note that the image data can be input via, for example, a memory card or memory card reader. A print instruction is issued for the input image data via the application 202. Furthermore, the image data is transferred to a printer driver 206 that operates under the control of the operating system in accordance with the print instruction. The printer driver 206 executes color matching processing 203 to convert the image data into that expressed by another color space. In this color matching processing, sRGB data is converted into RGB data in a color gamut depending on the printing apparatus in accordance with the expressible color gamut of the printing apparatus.

Note that conversion of image data is generally implemented by performing tetrahedron interpolation processing or the like with reference to a three-dimensional LUT (lookup table).

The printer driver 206 executes ink color decomposition processing 204 to convert, into CMYK ink signal data, the RGB data converted by the color matching processing. The ink color decomposition processing is also executed by using the three-dimensional LUT, similarly to the color matching processing. An ink color decomposition table holding unit 207 holds an LUT created in advance, and an LUT generated by automatic generation processing (to be described later) can be added to the ink color decomposition table holding unit 207. The printer driver 206 executes halftone processing 205. The image data is quantized by the halftone processing to generate print data. For example, error diffusion processing is applied to the quantization processing.

In the printing apparatus 208, a printing processing unit 210 executes dot arrangement processing, mask processing, and the like based on the print data input from the host apparatus 201, thereby executing printing. The printing apparatus 208 may execute the above-described color matching processing 203, ink color decomposition processing 204, and halftone processing 205. In this case, image information processed by the application 202 of the host apparatus 201 is transferred to the printing apparatus 208, an image processing unit 209 executes the color matching processing, the ink color decomposition processing, and the halftone processing, and the printing processing unit 210 executes the dot arrangement processing, the mask processing, and the like.

As shown in FIG. 1B, a microprocessor (CPU) 211 of the host apparatus 201 executes a program such as the OS, printer driver 206, and application 202 using a RAM 212. Note that programs such as the OS, printer driver 206, and application 202 and respective LUTs are stored in a ROM 213 and an HDD 214. The CPU 211 controls an interface 216 via a system bus 215, and inputs/outputs various kinds of data. The UI or the like can be displayed on a display 218 via a video card 217, thereby transmitting/receiving data to/from the printing apparatus 208 via the interface (I/F) 216.

LUT automatic generation processing (to be described later) will be described using an ink signal value expressing each ink color of each pixel in 8 bits.

Figures 2A, 2B:
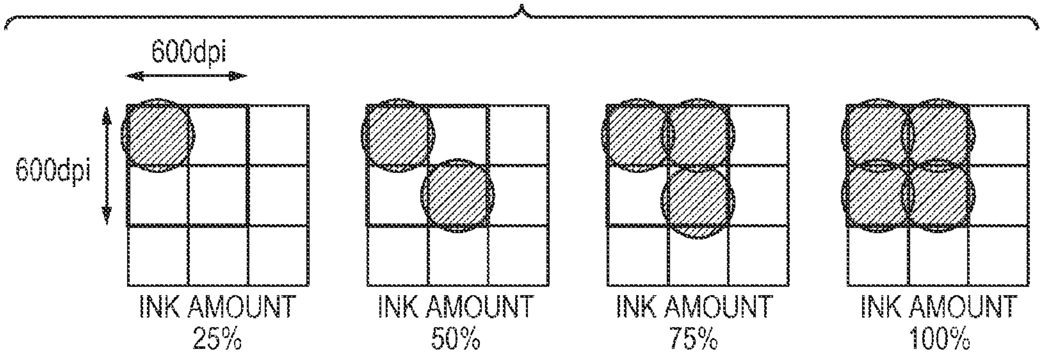
FIGS. 2A and 2B are views for respectively explaining the relationship between an ink signal and an ink amount and the definition of the ink amount.

FIGS. 2A and 2B are views for respectively explaining the relationship between an ink signal and an ink amount, and the definition of the ink amount.

FIG. 2A shows an example of the relationship between the 8-bit ink signal value and the ink amount. In this case, the ink signal value can take 256 values “0” to “255”. As shown in FIG. 2A, each value is associated with the ink amount.

The ink amount indicates an ink use amount per unit area. For example, as shown in FIG. 2B, in a case where one ink droplet of 3.5 μl is printed on a pixel of a resolution of 600 dpi×600 dpi, the ink amount is defined as 25%, in a case where two ink droplets are printed, the ink amount is defined as 50%, in a case where three ink droplets are printed, the ink amount is defined as 75%, and in a case where four ink droplets are printed, the ink amount is defined as 100%. In this way, by setting the ink signal value depending on the number of ink droplets to be printed on the pixel, it is possible to control the ink amount to be discharged onto a print medium.

Figure 3A:
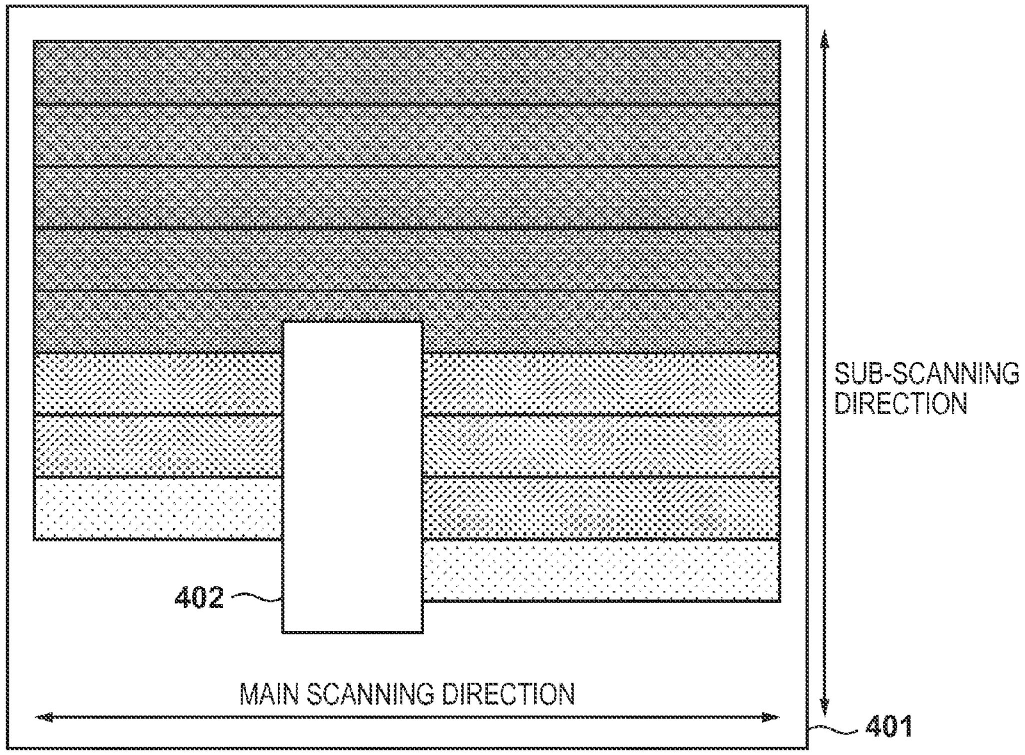
FIGS. 3A and 3B are views for respectively explaining a state of an image printing operation by a printhead and the nozzle arrangement of the printhead.
Figure 3B:
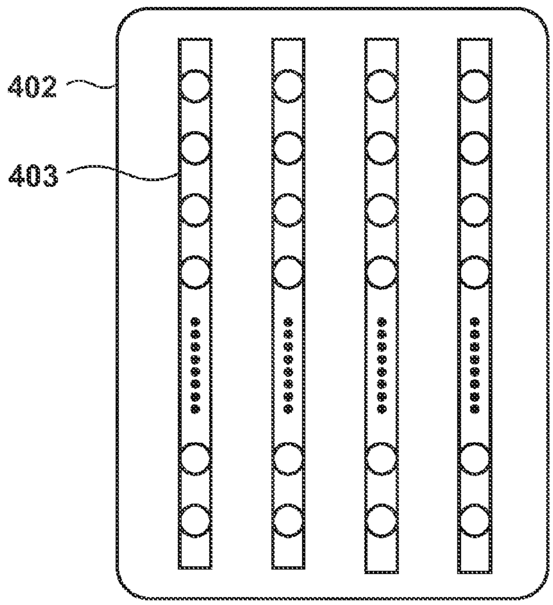

FIGS. 3A and 3B are views for respectively explaining a state of an image printing operation by the printhead and the nozzle arrangement of the printhead. FIG. 3A is a view showing a state in which an inkjet printhead 402 performs a serial scan to print an image on a print medium 401 such as print paper. On the other hand, FIG. 3B is a view showing the nozzle arrangement of the inkjet printhead 402.

In the printhead 402, a plurality of nozzle arrays in each of which a plurality of nozzles 403 for discharging ink are arrayed are arranged. There exist arrays the number of which is equal to that of ink colors to be used. For example, there are a nozzle array for discharging cyan (C) ink, that for discharging magenta (M) ink, that for discharging yellow (Y) ink, and that for discharging black (K) ink. The printhead 402 prints an image while the printhead 402 moves on the print medium 401 leftward and rightward (in the main scanning direction), as shown in FIG. 3A. Furthermore, every time the printhead 402 scans in the main scanning direction, the print medium is conveyed in the sub-scanning direction. By repeating this operation, the image is formed on the print medium.

The printing system according to the present invention is not limited to the inkjet printing apparatus, and a printing apparatus complying with an electrophotographic method for executing printing using toner, a silver halide printing apparatus, a sublimation printing apparatus, or the like may be used. Therefore, the ink amount to be mentioned below indicates a toner amount for the printing apparatus complying with the electrophotographic method, and each of the ink amount and the toner amount can generally be expressed as a print agent amount.

<Occurrence Principle and Counter-Measure of Unevenness in Glossiness>

Upon setting the ink use amount of each grid point of the LUT, it is necessary to consider the image quality in addition to color development, bleeding, and overflow. An example of the image quality is unevenness in glossiness.

The occurrence mechanism of unevenness in glossiness and a method of coping with it will now be described.

Figure 4A:
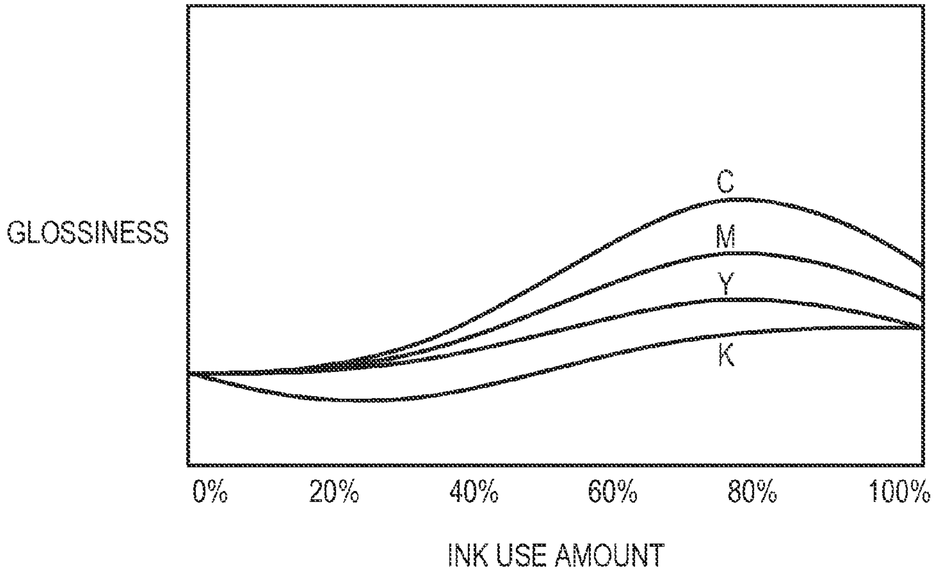
FIGS. 4A and 4B are graphs for explaining the cause of unevenness in glossiness and a method of coping with it.
Figure 4B:
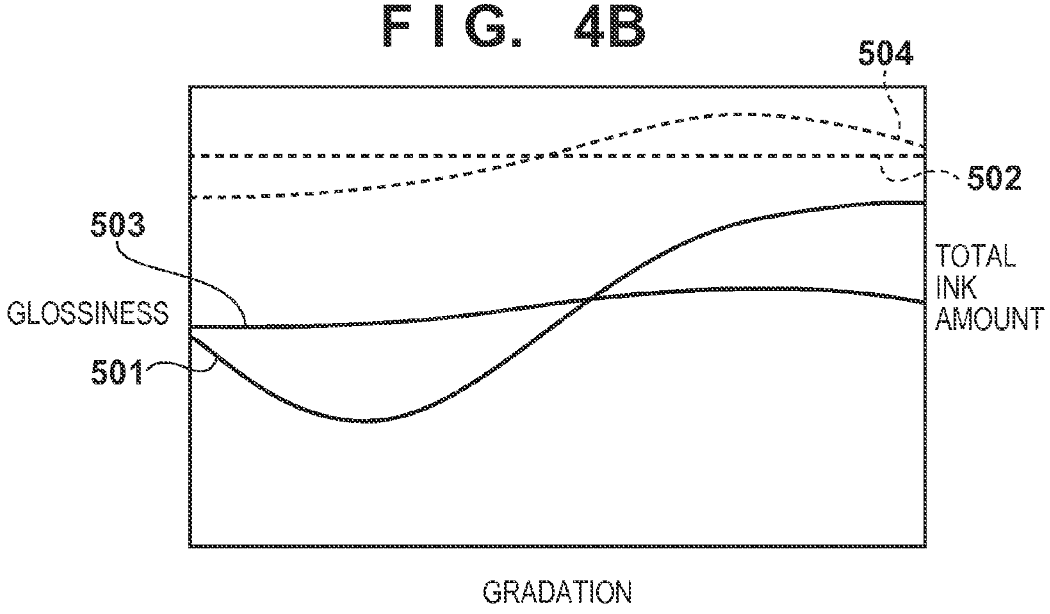

FIGS. 4A and 4B are graphs for explaining the cause of unevenness in glossiness and a method of coping with it.

(1) Occurrence Mechanism of Unevenness in Glossiness

FIG. 4A is a graph obtained by digitizing the glossiness of each ink type into a numerical value, and shows an example of the glossiness with respect to each ink use amount (0%, 20%, 40%, . . . , 100%) of each ink type (cyan ink, magenta ink, yellow ink, or black ink). As shown in FIG. 4A, it is found that the glossiness changes depending on the ink type and ink use amount.

FIG. 4B is a graph exemplifying the total amount of the ink use amounts and the numerical value of the glossiness in gradation in a case where an LUT is created using the inks with characteristics shown in FIG. 4A.

Referring to FIG. 4B, a solid line 501 and a broken line 502 respectively indicate the glossiness (solid line 501) and the total ink amount (broken line 502) in a case where the ink amount of each grid point as the total ink amount at each value of the gradation is limited and unevenness in glossiness occurs. Furthermore, a solid line 503 and a broken line 504 respectively indicate the glossiness (solid line 503) and the total ink amount (broken line 504) in a case where the ink amount of each grid point is adjusted at each value of the gradation to avoid unevenness in glossiness.

(2) Adjustment of Unevenness in Glossiness

As will be apparent from the solid line 501 and the broken line 502, if the same total ink amount is set for each value of the gradation, the glossiness does not become uniform, leading to unevenness in glossiness. This is because the glossiness largely changes depending on the ink type and the ink use amount, as described above. To cope with this, there is provided a method of adjusting the total ink amount at each value of the gradation, as indicated by the solid line 503.

With this method, it is possible to decrease a change in glossiness while reducing the total ink amount at each grid point of the LUT, thereby avoiding unevenness in glossiness. That is, to avoid unevenness in glossiness, it is necessary to set, at a grid point at which the glossiness specifically tends to decrease, a limit ink value unique to the grid point in addition to the above-described maximum ink amount, and emphasize the smoothness of the glossiness at each value of the gradation. Furthermore, by setting the limit ink value unique to the grid point, and limiting the total ink amount for each grid point, it is possible to avoid wasteful use of ink in addition to unevenness in glossiness. The wasteful use of ink indicates that a larger ink amount is set in a case where the color development does not improve even if the ink is increased, and this also changes for each grid point. Therefore, it is possible to avoid wasteful ink consumption by limiting the total ink amount for each grid point.

Embodiments of color decomposition table automatic creation processing especially executed by the host apparatus 201 of the above-described printing system will be described next.

First Embodiment

In this embodiment, a host apparatus 201 executes color decomposition table automatic generation processing. The user activates an application 202 via a UI such as a display 218. This application is stored in a hard disk (HDD) 214.

The color decomposition table automatic generation processing to be executed will be described below with reference to a flowchart. Note that a color decomposition table is expressed in the form of an LUT.

FIG. 5 is a flowchart illustrating LUT automatic generation processing.

In step S601, various generation conditions necessary to automatically generate an LUT are input.

FIG. 6 is a view showing the GUI of an application of automatically generating a color decomposition table (LUT). With reference to FIG. 6, the user selects corresponding print paper by a print paper selection portion 701, and selects a desired maximum ink amount level by a maximum ink amount selection portion 702. The print paper indicates, for example, glossy paper A, glossy paper B, glossy paper C, or the like, and the user selects desired print paper. The desired maximum ink amount level indicates, for example, level 1, 2, 3, 4, or 5, and these values correspond to ink limit values of 120%, 140%, 160%, 180%, and 200%, respectively.

In step S602, in accordance with the conditions set in step S601, grid point limit values and a reference LUT corresponding to the selected paper type are read out from the data area of the hard disk (HDD) 214. The reference LUT corresponding to the paper type is, for example, a reference LUT optimized in advance for each paper type such as plain paper, art paper, or glossy paper. Similarly, the grid point limit values are limit values for respective grid points for each paper type such as plain paper, art paper, or glossy paper.

The grid point limit values will be described in detail. As described above, to avoid unevenness in glossiness and wasteful ink consumption, it is necessary to set an ink limit value for each grid point of the LUT. The grid point limit value is obtained by setting the limit value as a maximum value configurable at each grid point for the print type.

FIGS. 7A and 7B are tables showing the values of the respective grid points of the LUTs corresponding to the paper types. FIG. 7A is a table representing an ink limit value at each grid point, and FIG. 7B is a table representing an ink signal value at each grid point.

Referring to FIG. 7A showing a specific example of the ink limit value at each grid point, an ID indicates the number of each grid point of each LUT. This example exemplifies an LUT constituted by 729 grid points. As shown in FIG. 7A, as for the whole ink limit amount, an ink limit value is set for each grid point ID. That is, it is possible to suppress unevenness in glossiness and wasteful ink consumption at each grid point by generating an LUT such that the ink limit value of each grid point is equal to or smaller than the set ink limit value.

FIG. 7B is a table showing values obtained by converting the ink limit values shown in FIG. 7A into ink signal values. In this embodiment, ink amount limiting processing (to be described later) for each grid point is executed using FIG. 7B. Note that in this embodiment, the ink limit values are set for all the grid points of the color decomposition table (LUT). However, an ink limit value may be set for one or more grid points of the color decomposition table (LUT). The ink signal value may be converted into an ink amount, and processing (to be described later) may be executed.

In step S603, a provisional LUT in which the maximum ink amount is increased or decreased is created in accordance with the reference LUT and the maximum ink amount level set in step S601. The provisional LUT is an LUT in which each grid point value is equal to/less than the designated maximum ink amount level, and does not consider the limit value for each grid point for avoiding unevenness in glossiness.

FIGS. 8A to 8D are views showing an example of a process of creating an LUT, in which values are limited, from the reference LUT via the provisional LUT.

One specific provisional LUT creation method is as follows. That is, assume that the ink signal values of cyan, magenta, yellow, and black of the reference LUT at any desired grid point with a maximum ink amount base max are indicated by base_ink_c, base_ink_m, base_ink_y, and base_ink_k. Assume also that the ink amount of the maximum ink amount level is indicated by level_ink. In this case, ink signal values tmp_ink_c, tmp_ink_m, tmp_ink_y, and tmp_ink_k at any desired grid point of the provisional LUT are calculated by:

$$tmp\_ink\_c = base\_ink\_c + (level\_ink/base\_max)*ink\_c$$

$$tmp\_ink\_m = base\_ink\_m + (level\_ink/base\_max)*ink\_m$$

$$tmp\_ink\_y = base\_ink\_y + (level\_ink/base\_max)*ink\_y$$

$$tmp\_ink\_k = base\_ink\_k + (level\_ink/base\_max)*ink\_k$$

According to the above equations, the ink signal values of the provisional LUT at all the grid points (in this embodiment, 729 grid points) are calculated. For example, the provisional LUT with the maximum ink amount of 160% (the sum of the ink signal values is 408) created based on the reference LUT with the maximum ink amount of 100% (the sum of the ink signal values is 255) according to this method is as shown in, for example, FIG. 8A. FIG. 8A shows an example in which the maximum ink amount of the reference LUT is smaller than that of the provisional LUT. The provisional LUT with the maximum ink amount of 160% (the sum of the ink signal values is 408) created based on the reference LUT with the maximum ink amount of 200% (the sum of the ink signal values is 510) according to this method is as shown in, for example, FIG. 8B. FIG. 8B shows an example in which the maximum ink amount of the reference LUT is larger than that of the provisional LUT. Note that each ink amount of the provisional LUT is changed by ratio calculation in this method. However, for example, the distribution of a light ink amount and deep ink amount may be changed so as to obtain the total ink amount as the result of the ratio calculation.

In step S604, for each grid point of the provisional LUT created in step S603, the ink signal value is limited to the ink limit value of the corresponding grid point or less.

Figure 9:
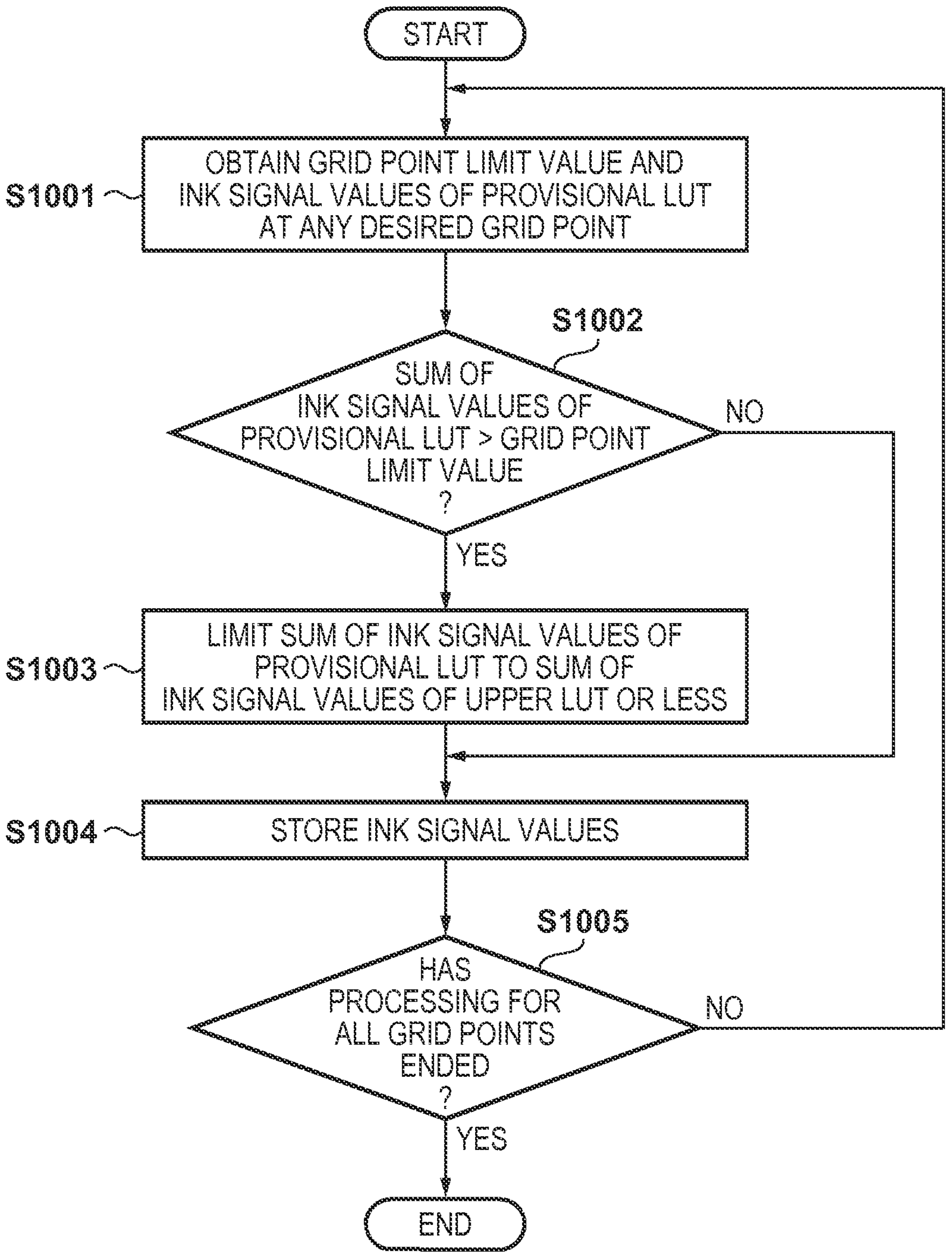
FIG. 9 is a flowchart illustrating details of processing of limiting an ink amount for each grid point in step S604.

FIG. 9 is a flowchart illustrating details of processing of limiting the ink amount of each grid point in step S604.

According to this flowchart, in step S1001, the provisional LUT and the grid point limit values stored in the hard disk (HDD) 214 are read out. With this operation, it is possible to obtain the ink signal value of each ink of the provisional LUT at a grid point corresponding to any desired grid point ID, and the grid point limit value of the grid point.

In step S1002, the grid point limit value and the sum of the ink signals of the provisional LUT at the grid point are compared with each other. If the grid point limit value is equal to or larger than the sum of the ink signals, it is determined that the ink signal values (ink amounts) are those which do not degrade the glossiness or do not wastefully consume ink. The process advances to step S1004 to directly store, at the corresponding grid point, the values of the provisional LUT as the ink signals of the limited LUT. On the other hand, if the sum of the signal values of the provisional LUT is larger than the grid point limit value, the grid point is determined as a grid point at which the glossiness degrades or ink is wastefully consumed, and the process advances to step S1003. In step S1003, the ink signal values of the provisional LUT are limited such that the sum of the ink signal values of the provisional LUT is equal to or smaller than the grid point limit value. After that, the process advances to step S1004 to store the limited ink signal values at the corresponding grid point.

The ink amount limiting processing is executed using, for example, the difference between the grid point limit value and the sum of the ink signal values of the provisional LUT, the ink types forming the grid point, and their ratio.

Assume that the ink signal values of cyan, magenta, yellow, and black of the provisional LUT at any desired grid point are represented by tmp_ink_c, tmp_ink_m, tmp_ink_y, and tmp_ink_k, respectively. Assume also that the sum of the ink signal values is represented by tmp_ink_sum and the grid point limit value is represented by —Lim_ink. In this case, the ink signal values rest_ink_c, rest_ink_m, rest_ink_y, and rest_ink_k after ink limitation of the grid point are limited by:

$$\mathrm{rest\_ink\_}c=\mathrm{tmp\_ink\_}c+\{(\mathrm{Lim\_ink}-\mathrm{tmp\_ink\_Sum})/(\mathrm{tmp\_ink\_Sum})\}*\mathrm{tmp\_ink\_}c$$

$$\mathrm{rest\_ink\_}m=\mathrm{tmp\_ink\_}m+\{(\mathrm{Lim\_ink}-\mathrm{tmp\_ink\_Sum})/(\mathrm{tmp\_ink\_Sum})\}*\mathrm{tmp\_ink\_}m$$

$$\mathrm{rest\_ink\_}y=\mathrm{tmp\_ink\_}y+\{(\mathrm{Lim\_ink}-\mathrm{tmp\_ink\_Sum})/(\mathrm{tmp\_ink\_Sum})\}*\mathrm{tmp\_ink\_}y$$

$$\mathrm{rest\_ink\_}k=\mathrm{tmp\_ink\_}k+\{(\mathrm{Lim\_ink}-\mathrm{tmp\_ink\_Sum})/(\mathrm{tmp\_ink\_Sum})\}*\mathrm{tmp\_ink\_}k$$

If the grid point limit value is equal to or larger than the sum of the ink signal values of the grid point of the provisional LUT, the sum of the ink signal values of the provisional LUT may be increased to the limit value of the limit value grid point. That is, it is possible to improve the color development by increasing the ink amount to the limit amount which does not influence the image quality. In this case as well, it is possible to calculate the respective ink amounts using the above equations.

In step S1005, it is checked whether the processing for all the grid points (in this embodiment, the 729 grid points) of the LUT has ended. If it is determined to continue the processing, the process returns to step S1001; otherwise, the process ends.

FIGS. 8C and 8D are views each showing an example of an LUT in which values are limited with respect to the provisional LUT upon application of limitation processing of glossy paper C in a case where the glossy paper C is selected in selection of the generation conditions in step S601. FIG. 8C shows a result of limiting the ink amounts of the provisional LUT shown in FIG. 8A, and FIG. 8D shows a result of controlling the ink amounts of the provisional LUT shown in FIG. 8B.

According to the above-described embodiment, it is possible to automatically generate an LUT with the maximum ink amount desired by the user or less by applying the LUT in which the value of the ink amount of each grid point is limited. In this way, the ink amount is limited for each grid point corresponding to each ink signal value, and thus it is possible to prevent unevenness in glossiness from occurring in a printed image, and prevent wasteful ink consumption.

Second Embodiment

In this embodiment, an example will be described in which color decomposition table automatic generation processing is executed by holding a reference LUT of limit ink amounts different from the reference LUT in place of the grid point limit values and using the two LUTs so that each grid point has an ink signal value equal to or smaller than a limit value. Note that only part characteristic to this embodiment will be described, and a description of common parts already described in the first embodiment will be omitted.

Figure 10:
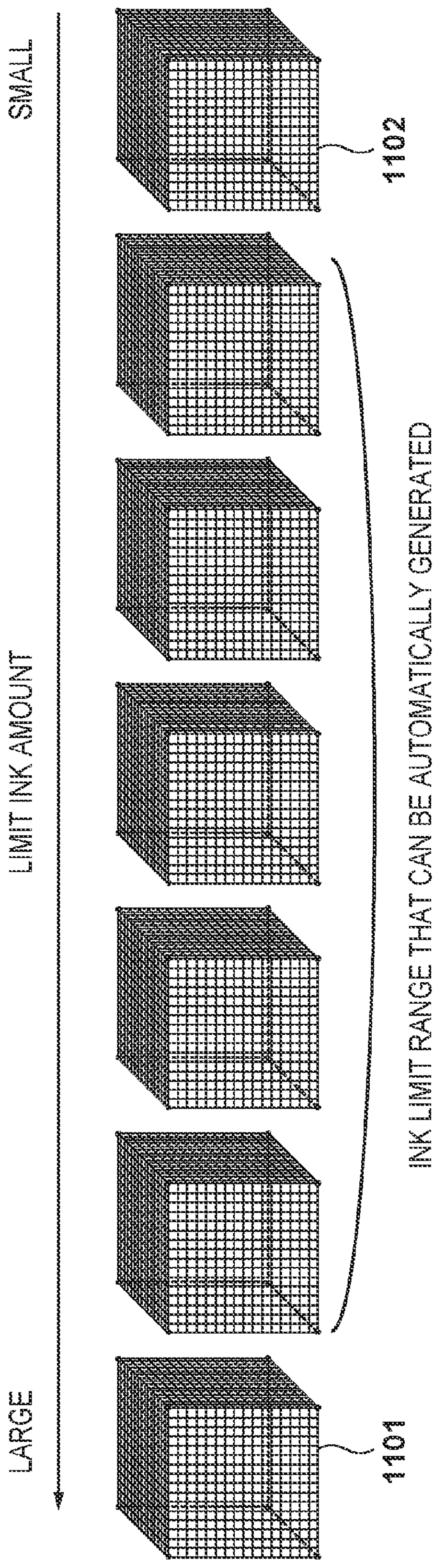
FIG. 10 is a view showing the relationships between two reference LUTs and the range of limit ink values that can be automatically generated.

FIG. 10 is a view showing the relationship between the two reference LUTs and the range of the limit ink value that can be automatically generated. In this embodiment, as shown in FIG. 10, an LUT (to be referred to as an upper LUT hereinafter) 1101 whose maximum ink amount serves as an upper limit and an LUT (to be referred to as a lower LUT hereinafter) 1102 whose maximum ink amount serves as a lower limit are created in advance at two ends of the range of the limit ink amounts that can be automatically generated. In the upper LUT 1101, if the maximum ink amount is largest, the ink signal value of each grid point is optimized, and unevenness in glossiness or wasteful ink consumption does not occur. Therefore, the ink signal value of each grid point of the upper LUT is equal to the ink limit value of each grid point.

In consideration of this, color decomposition table (LUT) automatic generation processing according to the second embodiment will be described with reference to a flowchart.

Figure 11:
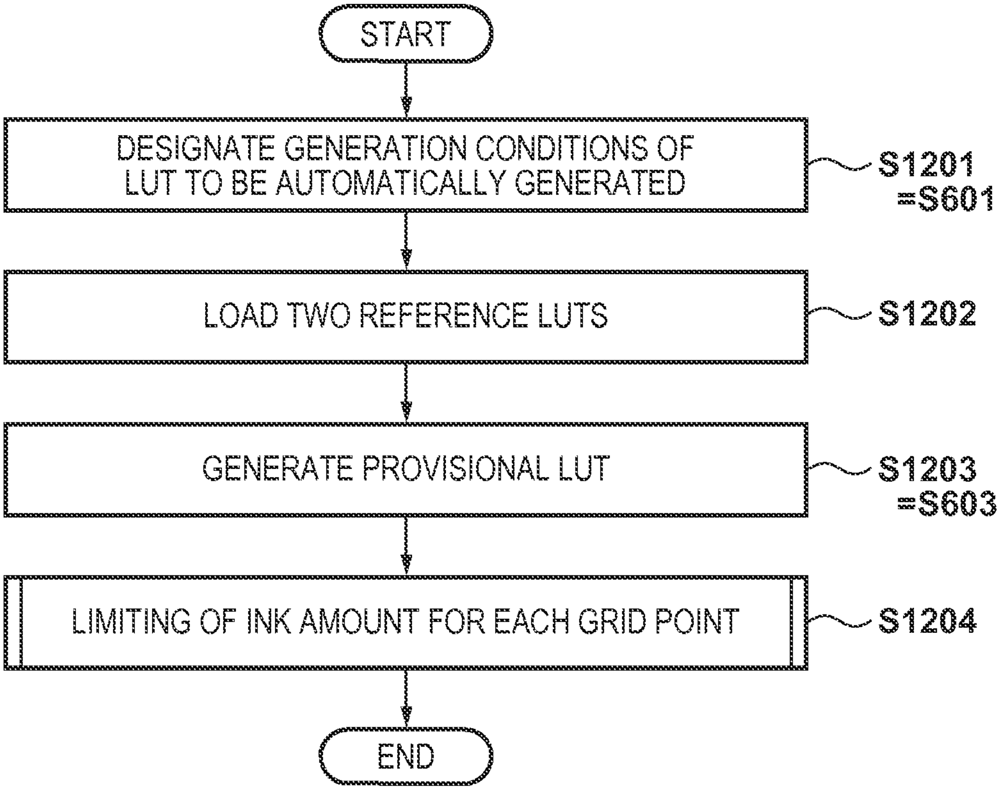
FIG. 11 is a flowchart illustrating processing of automatically generating a color decomposition table (LUT) according to the second embodiment.

FIG. 11 is a flowchart illustrating the LUT automatic generation processing according to the second embodiment.

In step S1201, generation conditions for automatic generation are input, similarly to step S601 in the first embodiment. In step S1202, in accordance with the conditions set in step S1201, two LUTs corresponding to a paper type are loaded from the data area of a hard disk (HDD) 214. In this example, the upper LUT and lower LUT are read out as two reference LUTs optimized in advance for each paper type such as plain paper, art paper, or glossy paper.

Furthermore, in step S1203, a provisional LUT is created in the same method as that described in step S603 of the first embodiment. Note that one of the two reference LUTs, that is, the upper LUT and lower LUT can be selected and used as a reference LUT used to generate the provisional LUT, unlike the first embodiment.

The reference LUTs are properly used in accordance with a maximum ink amount level selected and set in step S1201.

More specifically, if the selected ink limit level is relatively high, the upper LUT is used. Alternatively, if the selected ink limit level is relatively low, the lower LUT is used.

As another selection method, the weighted average of the two reference LUTs is obtained to generate a new reference LUT, and the provisional LUT may be generated using the newly generated reference LUT. In general, upon creating a plurality of LUTs with different maximum ink amounts, the LUT with a large maximum ink amount and the LUT with a small maximum ink amount use different ink combinations and different ink amount ratios. Since the LUT with the large maximum ink amount has an enough ink limit amount, a printing apparatus using four ink colors uses process gray obtained by combining C, M, and Y inks to improve the graininess. A printing apparatus using light ink attempts to improve the graininess and the like by using a large amount of light ink. On the other hand, since the LUT with the small maximum ink amount does not have an enough ink limit amount, if process gray and light ink are used, it is impossible to sufficiently ensure the color development. Therefore, the use amounts of process gray and light ink are suppressed.

As described above, it is possible to create an optimum LUT in accordance with the maximum ink amount level by switching the reference LUT in accordance with the selected maximum ink amount level.

In step S1204, the ink amount of each grid point is limited such that the value of the provisional LUT created in step S1203 is equal to or smaller than the grid point limit value of the corresponding grid point.

Figure 12:
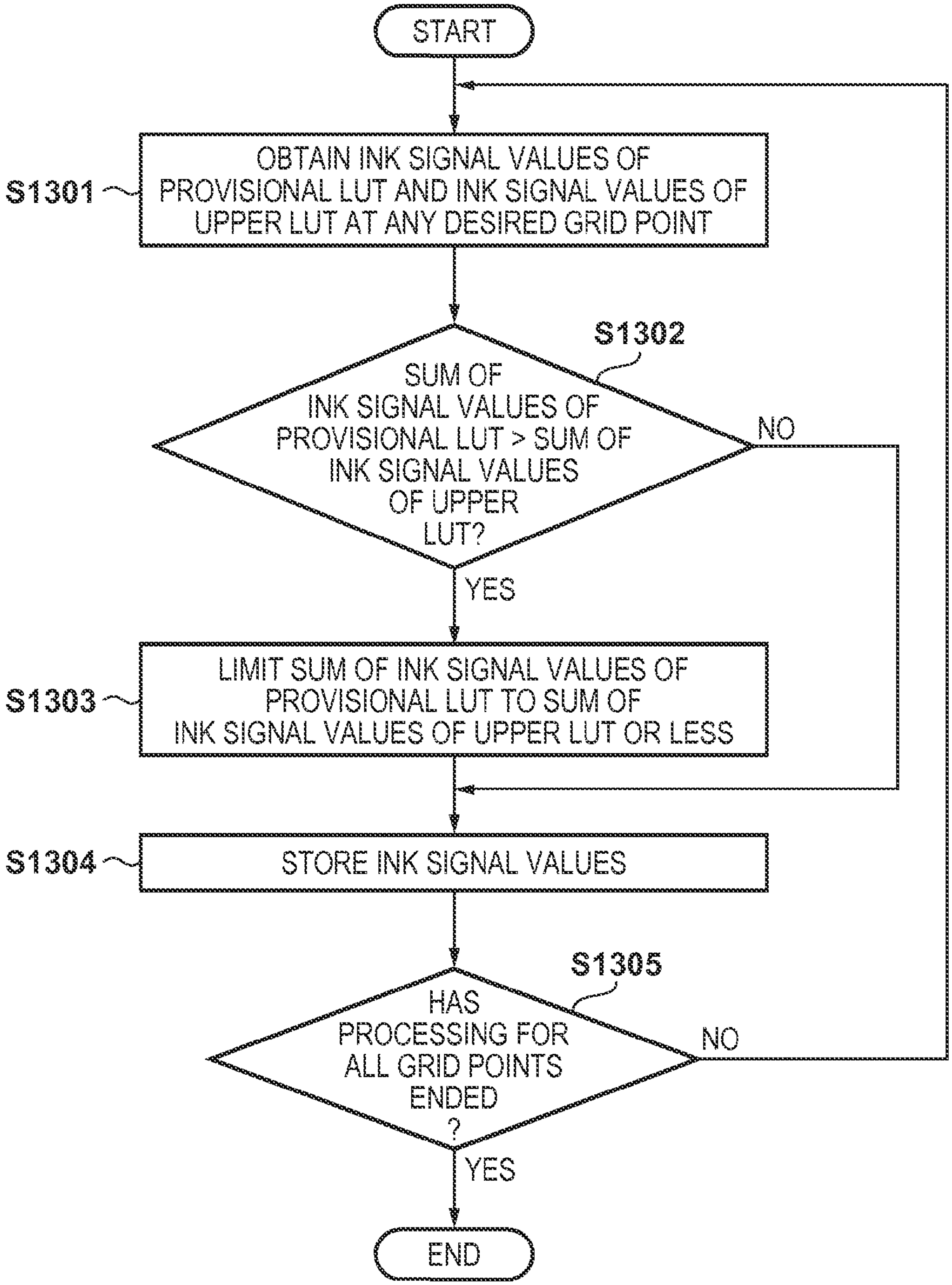
FIG. 12 is a flowchart illustrating details of processing of limiting an ink amount for each grid point in step S1204.
Figure 13:
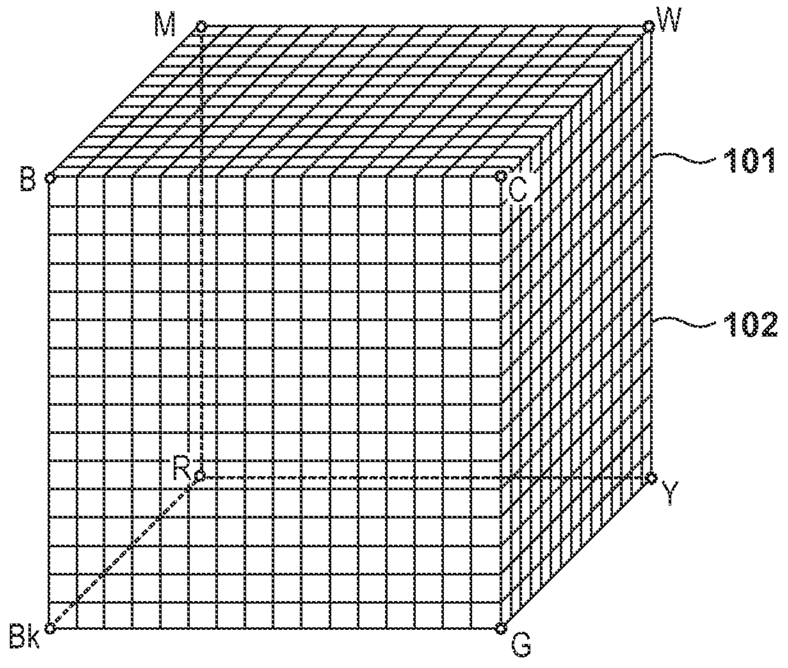
FIG. 13 is a view showing an example of an LUT.

FIG. 12 is a flowchart illustrating details of processing of limiting the ink amount of each grid point in step S1204. As will be apparent by comparing FIGS. 12 and 9, the second embodiment is different from the first embodiment in that the ink signal of each grid point of the upper LUT is used as a limit value instead of the grid point limit value used in the first embodiment. As described above, the sum of the ink signals of each grid point of the upper LUT is equal to the grid point limit value, and can thus be substituted.

According to this flowchart, in step S1301, the provisional LUT and upper LUT stored in the hard disk (HDD) 214 are read out. With this processing, the ink amount of each ink of the provisional LUT at a grid point corresponding to any desired grid point ID and the ink signal value of each ink of the upper LUT at the grid point are obtained.

In step S1302, the sum of the ink signal values of the provisional LUT at the grid point is compared with the sum of the ink signal values of the upper LUT at the grid point. If the sum of the ink signal values of the upper LUT is equal to or larger than the sum of the ink signal values of the provisional LUT, it is determined that the ink amount does not degrade the glossiness, and the process advances to step S1304. In step S1304, the ink signal values of the provisional LUT are directly stored at the corresponding grid point as the ink signal values of the limited LUT.

To the contrary, if the sum of the ink signal values of the provisional LUT is larger than the sum of the ink signal values of the upper LUT, the grid point is determined as a grid point at which the glossiness degrades, and the process advances to step S1303. In step S1303, the ink signal values of the provisional LUT are limited such that the sum of them is equal to or smaller than the sum of the ink signal values of the upper LUT. In step S1304, the limited ink signal values are stored at the corresponding grid point.

The ink amount limiting processing is executed to limit the ink signal values, using, for example, the difference between the total ink amount of the provisional LUT and that of the upper LUT, the ink types forming the grid point, and their ratio.

More specifically, assume that the ink signal values of cyan, magenta, yellow, and black of the provisional LUT at any desired grid point are represented by tmp_ink_c, tmp_ink_m, tmp_ink_y, and tmp_ink_k, respectively. Assume also that the sum of the ink signal values is represented by tmp_ink_sum and the ink signal value at the corresponding grid point of the upper LUT is represented by max_ink_sum. In this case, ink signal values rest_ink_c, rest_ink_m, rest_ink_y, and rest_ink_k at each grid point after ink limitation are limited by:

rest_ink_*c*=tmp_ink_*c*+{(max ink_Sum−tmp_ink_sum)/tmp_ink_sum}*tmp_ink_*c* rest_ink_*m*=tmp_ink_*m*+{(max_ink_Sum−tmp_ink_sum)/tmp_ink_sum}*tmp_ink_*m* rest_ink_*y*=tmp_ink_*y*+{(max_ink_Sum−tmp_ink_sum)/tmp_ink_sum}*tmp_ink_*y* rest_ink_*k*=tmp_ink_*k*+{(max_ink_Sum−tmp_ink_sum)/tmp_ink_sum}*tmp_ink_*k*

In step S1305, it is checked whether the processing for all the grid points (in this embodiment, the 729 grid points) of the LUT has ended. If it is determined to continue the processing, the process returns to step S1301; otherwise, the process ends.

According to the above-described embodiment, therefore, it is possible to hold two reference LUTs, and control ink signal values for each grid point. By holding two reference LUTs and properly using them in accordance with the ink limit level designated by the user, it is possible to automatically generate an optimum LUT. Furthermore, by using the sum of the ink signal values of the reference LUT instead of the grid point limit value, it is possible to set an optimum ink limit value for each grid point.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-226402, filed Nov. 6, 2014, which is hereby incorporated by reference herein in its entirety.

What is claimed is:

1. An image processing apparatus for creating a lookup table in correspondence with a print medium to be used and a print agent amount to be used for printing on the print medium, and performing image processing for input image data using the created lookup table, comprising:

a holding unit configured to hold a reference lookup table corresponding to a type of the print medium, and a limit value configurable at each grid point of the created lookup table;

a setting unit configured to set the type of the print medium to be used and a maximum print agent amount;

a creating unit configured to create a provisional lookup table based on the reference lookup table held in the holding unit, and the print medium and the maximum print agent amount which have been set by the setting unit;

a comparison unit configured to compare a value of each grid point of the provisional lookup table created by the creating unit with the limit value configurable at each grid point;

a generation unit configured to generate, based on a result of comparison by the comparison unit, a lookup table such that a value of each grid point is not larger than the limit value configurable at each grid point; and an image processing unit configured to perform image processing for the input image data using the lookup table generated by the generation unit.

2. The apparatus according to claim 1, wherein the lookup table is a three-dimensional color decomposition lookup table, and the type of the print medium includes plain paper, art paper, and glossy paper.

3. The apparatus according to claim 2, wherein the holding unit holds a limit value to be set at at least one grid point included in the color decomposition lookup table.

4. The apparatus according to claim 1, wherein the generation unit limits the value of each grid point such that the value of the lookup table is not larger than the limit value in a case where the value of each grid point of the provisional lookup table is larger than the limit value configurable at each grid point, and directly uses the value of the provisional lookup table to generate the lookup table in a case where the limit value configurable at each grid point is not smaller than the value of each grid point of the provisional lookup table.

5. The apparatus according to claim 1, wherein the holding unit holds, as the reference lookup tables, a first reference lookup table serving as an upper limit of a range of the print agent amount and a second reference lookup table serving as a lower limit of the range of the print agent amount, and the creating unit creates the provisional lookup table using at least one of the first reference lookup table and the second reference lookup table in accordance with the maximum print agent amount set by the setting unit.

6. The apparatus according to claim 5, wherein the creating unit selects the first reference lookup table in a case where the maximum print agent amount set by the setting unit is large, and selects the second reference lookup table in a case where the maximum print agent amount set by the setting unit is small.

7. The apparatus according to claim 5, wherein the creating unit obtains a weighted average of the first reference lookup table and the second reference lookup table to generate a new reference lookup table, and creates the provisional lookup table using the generated new reference lookup table.

8. The apparatus according to claim 5, wherein the generation unit limits the value of each grid point such that the value of the lookup table is not larger than the value of each grid point of the first reference lookup table in a case where the value of each grid point of the provisional lookup table is larger than the value of each grid point of the first reference lookup table, and directly uses the value of the provisional lookup table to generate the lookup table in a case where the value of each grid point of the first reference lookup table is not smaller than the value of each grid point of the provisional lookup table.

9. The apparatus according to claim 1, wherein the setting unit includes a user interface used by a user to perform setting.

10. The apparatus according to claim 1, further comprising a transfer unit configured to transfer, to a printing apparatus, the image data having undergone the image processing by the image processing unit.

11. The apparatus according to claim 10, wherein the printing apparatus includes a printhead configured to execute printing according to an inkjet method, and the print agent amount indicates an ink amount.

12. The apparatus according to claim 11, wherein the ink amount is defined in accordance with a number of ink droplets to be printed on a pixel of a resolution at which the printhead executes printing.

13. A non-transitory computer readable storage medium which stores a computer program to be executed in a processor of an image processing apparatus for creating a lookup table in correspondence with a print medium to be used and a print agent amount to be used for printing on the print medium, and performing image processing for input image data using the created lookup table, the program comprising:

holding a reference lookup table corresponding to a type of the print medium, and a limit value configurable at each grid point of the created lookup table;

setting the type of the print medium to be used and a maximum print agent amount;

creating a provisional lookup table based on the held reference lookup table, and the print medium and the maximum print agent amount which have been set;

comparing a value of each grid point of the created provisional lookup table with the limit value configurable at each grid point;

generating, based on a result of the comparing, a lookup table such that a value of each grid point is not larger than the limit value configurable at each grid point; and performing image processing for input image data using the generated lookup table.

14. An image processing method for an image processing apparatus for creating a lookup table in correspondence with a print medium to be used and a print agent amount to be used for printing on the print medium, and performing image processing for input image data using the created lookup table, the method comprising:

holding a reference lookup table corresponding to a type of the print medium, and a limit value configurable at each grid point of the created lookup table;

setting the type of the print medium to be used and a maximum print agent amount;

creating a provisional lookup table based on the held reference lookup table, and the print medium and the maximum print agent amount which have been set;

comparing a value of each grid point of the created provisional lookup table with the limit value configurable at each grid point;

generating, based on a result of the comparing, a lookup table such that a value of each grid point is not larger than the limit value configurable at each grid point; and performing image processing for the input image data using the generated lookup table.

15. The method according to claim 14, wherein the lookup table is a three-dimensional color decomposition lookup table, and the type of the print medium includes plain paper, art paper, and glossy paper.

16. The method according to claim 14, wherein in the generating the lookup table, in a case where the value of each grid point of the provisional lookup table is larger than the limit value configurable at each grid point, the value of each grid point is limited such that the value of the lookup table is not larger than the limit value, and in a case where the limit value configurable at each grid point is not smaller than the value of each grid point of the provisional lookup table, the value of the provisional lookup table is directly used to generate the lookup table.

17. The method according to claim 14, wherein in the holding, a first reference lookup table serving as an upper limit of a range of the print agent amount and a second reference lookup table serving as a lower limit of the range of the print agent amount are held as the reference lookup tables, and in the creating the provisional lookup table, at least one of the first reference lookup table and the second reference lookup table is used in accordance with the set maximum print agent amount to create the provisional lookup table.

18. The method according to claim 17, wherein in the creating the provisional lookup table, in a case where the set maximum print agent amount is large, the first reference lookup table is selected, and in a case where the set maximum print agent amount is small, the second reference lookup table is selected.

19. The method according to claim 17, wherein in the generating the provisional lookup table, a weighted average of the first reference lookup table and the second reference lookup table is obtained to generate a new reference lookup table, and the provisional lookup table is created using the generated new reference lookup table.

20. The method according to claim 17, wherein in the generating the lookup table, in a case where the value of each grid point of the provisional lookup table is larger than the value of each grid point of the first reference lookup table, the value of each grid point is limited such that the value of the lookup table is not larger than the value of each grid point of the first reference lookup table, and in a case where the value of each grid point of the first reference lookup table is not smaller than the value of each grid point of the provisional lookup table, the value of the provisional lookup table is directly used to generate the lookup table.

* * * * *